US012355588B2

(12) United States Patent
Ruble et al.

(10) Patent No.: US 12,355,588 B2
(45) Date of Patent: Jul. 8, 2025

(54) COMMUNICATION RESILIENCE IN A RING NETWORK TOPOLOGY (71) Applicant: ADTRAN, Inc., Huntsville, AL (US)

(72) Inventors: Andrew T. Ruble, Athens, AL (US); Douglas T. Albright, Huntsville, AL (US); Darrin Leroy Gieger, Pell City, AL (US); Stefan Diener, Brandenburg (DE); Frank Below, Berlin (DE)

(73) Assignee: ADTRAN, Inc., Huntsville, AL (US)

( * ) Notice: Subject to any disclaimer, the term of this patent is extended or adjusted under 35 U.S.C. 154(b) by 215 days.

(21) Appl. No.: 17/954,708

(22) Filed: Sep. 28, 2022

(65) Prior Publication Data

US 2024/0106680 A1 Mar. 28, 2024

(51) Int. Cl.
*G06F 15/173* (2006.01)
*H04L 12/46* (2006.01)

(52) U.S. Cl.
CPC ...... *H04L 12/4637* (2013.01); *H04L 12/4641* (2013.01)

(58) Field of Classification Search
CPC .......... H04L 12/4637; H04L 12/4641
See application file for complete search history.

(56) References Cited

U.S. PATENT DOCUMENTS

| 8,520,507 | B1 * | 8/2013 | Shah | H04L 69/40 370/222 |
| 2018/0212828 | A1 * | 7/2018 | Sekhri | H04L 12/4641 |
| 2019/0260671 | A1 | 8/2019 | Caird et al. | |

FOREIGN PATENT DOCUMENTS

| CN | 114401324 | 4/2022 |
| CN | 114465942 | 5/2022 |
| EP | 3534571 | 9/2019 |

OTHER PUBLICATIONS

Extended European Search Report in European Appln. No. 23200576.9, mailed on Feb. 2, 2024, 9 pages.

* cited by examiner

*Primary Examiner* — Padma Mundur
(74) *Attorney, Agent, or Firm* — Fish & Richardson P.C.

(57) ABSTRACT

Methods, systems, and apparatus, including computer programs encoded on a computer storage medium, for communication resilience in a Ring Network Topology. In some aspects, a top Ethernet node, implemented in a Ring Network Topology ("RNT") that includes multiple additional Ethernet nodes, receives downstream traffic having a virtual local area network ("VLAN") service address. The top Ethernet node can determine that the downstream traffic is destined for a given device serviced by a given Ethernet node, from among the multiple additional Ethernet nodes, that terminates a given Ethernet Ring Protection Switching ("ELPS") group. The top Ethernet node can determine a given VLAN subnetwork that has been mapped to the given ELPS group, and transmit the downstream traffic through the RNT using the given VLAN subnetwork.

20 Claims, 4 Drawing Sheets

COMMUNICATION RESILIENCE IN A RING NETWORK TOPOLOGY

BACKGROUND

Network operators often choose ring topologies to provide resiliency while minimizing the physical connections to the core router network. Typically, a protocol like ERPS (Ethernet Ring Protection Switching, ITU G.8032) is used for resilience in such a ring architecture, but ERPS can lead to issues such as flooding, isolation of impact due to outages, and latency. ERPS is also generally more oriented to MAC switching than VLAN switching.

SUMMARY

In general, one innovative aspect of the subject matter described in this specification can be embodied in methods that include the actions of receiving, by a top Ethernet node implemented in a Ring Network Topology ("RNT") that includes multiple additional Ethernet nodes, downstream traffic having a virtual local area network ("VLAN") service address; determining, by the top Ethernet node, that the downstream traffic is destined for a given device serviced by a given Ethernet node, from among the multiple additional Ethernet nodes, that terminates a given Ethernet Ring Protection Switching ("ELPS") group; determining, by the top Ethernet node, a given VLAN subnetwork that has been mapped to the given ELPS group; and transmitting, by the top Ethernet node, the downstream traffic through the RNT using the given VLAN subnetwork. Other embodiments of this aspect include corresponding systems, apparatus, and computer programs, configured to perform the actions of the methods, encoded on computer storage devices.

These and other embodiments can each optionally include one or more of the following features. Methods can include receiving, by the top Ethernet node, upstream traffic from the multiple additional Ethernet nodes in the RNT; extracting, from the upstream traffic, an address of a device from which the upstream traffic originated; storing, in a memory, the address of each of the devices from which the upstream traffic originated; storing, in the memory, a mapping between (i) the address of each particular device from which the upstream traffic originated and (ii) a VLAN subnetwork that is assigned to an ELPS group that is terminated by a particular Ethernet node that services the particular device.

Determining that the downstream traffic is destined for a device serviced by a given Ethernet node that terminates a given Ethernet Ring Protection Switching ("ELPS") group can include identifying the stored mapping between the address of the device and the given ELPS.

Methods can include provisioning at least n−1 different VLAN subnetworks for the multiple additional Ethernet nodes, wherein n is a total number of the additional Ethernet nodes that are in the RNT with the top Ethernet node.

Methods can include determining that the downstream traffic is multicast traffic. Determining that the downstream traffic is destined for a given device serviced by a given Ethernet node can include determining that an address of the device is included in a multicast group created for the multi-cast traffic. Transmitting the downstream traffic through the RNT using the given VLAN subnetwork can be conditioned on the determination that the address of the given device is included in the multi-cast group created for the multi-cast traffic.

Methods can include determining that the downstream traffic is multicast traffic. Determining that the downstream traffic is destined for a given device serviced by a given Ethernet node can include determining that the multicast traffic is to be flooded to multiple VLANs in the RNT based on a lack of a multicast group being maintained by the top Ethernet node.

Methods can include detecting that a switching condition exists on a working path that is being used to carry traffic between the top Ethernet node and the given Ethernet node; and switching, based on the detected switching condition, transmission of traffic using the given VLAN subnetwork to a protection path between the top Ethernet node and the given Ethernet node, wherein the protection path is a different portion of the RNT that connects the top Ethernet node and the given Ethernet node than the working path.

A second top Ethernet node can operate as another entry point to the RNT. The second top Ethernet node can maintain a mapping of ELPS groups to VLAN subnetworks for traffic entering the RNT through the second top Ethernet node.

Particular embodiments of the subject matter described in this specification can be implemented so as to realize one or more of the following advantages. These advantages include rapid protection switching between an active path (also referred to as a working path) and a standby path (also referred to as a protection path) when a failure occurs on the active path. The techniques discussed herein greatly reduce the resource requirement of the hardware tables used for mac address storage compared to other methods. Fault failovers are much faster because they are end to end driven detections rather than relying on propagation delay of messages via other methods. The inner nodes of transport are not aware or interacting with the end to end protection and thus allow a mix of transport and path protection without impacting this resiliency scheme. The described techniques allow for different entry points and exist points around the ring. This allows for various service deployments that are all optimized for their own key performance indicators and service level agreements without impacting other services. The overhead of the control packets is extremely small compared to other encapsulation methods requiring additional overhead per data packet such as other methods. The existence of working and protect models allow load balancing techniques between any two paths of a two end-point system. Multiple endpoints are not required to traverse the same two paths, allowing balance techniques to be used to optimize the transport capacity without sacrifice of the resiliency. Data packets will traverse a single path at any given time, allowing ordering of packets to be preserved unlike other methods that will route or hash a given stream multiple directions. Troubleshooting techniques and tracing of services is simplified to end point debug rather than complex tracing through forwarding tables throughout the network. Ring topologies do not need to be exactly overlaid with each other, and can have subrings or various legs of a ring overlaid with common nodes being present on multiple rings.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification discusses techniques, methods, and systems for implementing an ELPS (Ethernet Linear Protection Switching) protocol in a communications system having a Ring Network Topology. As discussed in more detail below, the ELPS protocol can be implemented by creating concentric rings of ELPS connections to each ring node, with each node being a termination point for a different ELSP group. In some implementations, each ELPS is operating on its own VLAN so that shared services can be supported by the ELPS protected Ring Topology.

Figure 1:
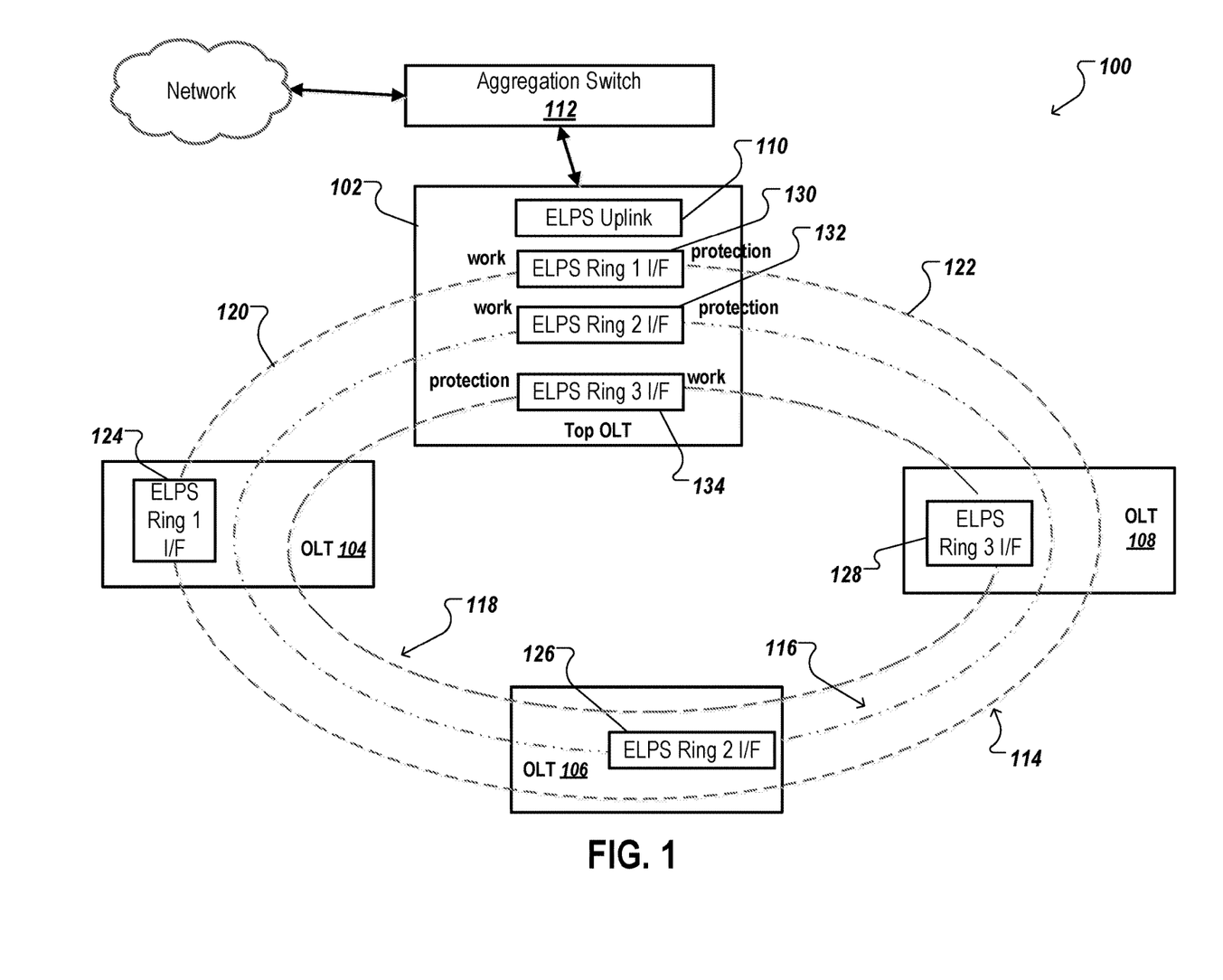
FIG. 1 is an illustration of an example Ring Network Topology implementing an ELPS protocol.

FIG. 1 is an illustration of an example Ring Network Topology ("RNT") 100 implementing an ELPS protocol. The RNT 100 includes multiple optical line terminals "OLTs" that are connected in a ring configuration. For example, OLT 102, OLT 104, OLT 106, and OLT 108 are each connected to two other OLTs using pairs of communication paths, which are established to create redundant links between the OLTs. Each pair of communication paths includes a working path and a protection path. Generally, only one path among each pair of paths is active at any given time, such that one of the paths is an active path and the other is a standby path. Typically in a non-fault state, the working path is the active path and the protection path is the standby path. When a switching condition (e.g., communication failure) is detected on the active path, the standby path become the active path, and vice versa.

OLTs are depicted in the RNT 100 of FIG. 1 for purposes of example, but the techniques discussed herein could be used with other Ethernet nodes or network elements, such as routers, switches, gateways, and the like. As such, the phrase "Ethernet node" can replace each reference to an OLT in this description. OLTs and the other devices referenced above can each include hardware communication interfaces, data processing devices, and memory devices that enable these devices to perform the operations discussed herein. The OLTs and other devices can also include other communications interfaces and/or peripheral interfaces that enable these devices to connect with other devices.

An OLT typically connects a passive optical network to aggregated uplinks and transmits shared downstream data over the passive optical network to users. For example, as shown in FIG. 1, OLT 102 includes an ELPS uplink 110 that is connected to an aggregation switch 112. As the entry point to the RNT 100, the OLT 102 can be referred to as the "Top OLT", and all traffic destined for the OLTs in the RNT 100 can pass through the OLT 102.

As shown, OLT 104, OLT 106, and OLT 108, each includes an ELPS interface (e.g., 124, 126, and 128) that implements the ELPS functionality for that OLT, and each of those OLTs terminates a different ELPS group. The top OLT (i.e., OLT 102 in FIG. 1) includes ELPS interfaces (e.g., 130, 132, and 134) for each of the ELPS groups implemented in the RNT 100. Corresponding pairs of ELPS interfaces (e.g., 124 and 130) enable switching between the working path and the protection path for each of the OLTs (e.g., 104) that terminates an ELPS group in the RNT 100. For example, the ELPS interface 124 can terminate ELPS group 1, ELPS interface 126 can terminate ELPS group 2, and ELPS interface 128 can terminate ELPS group 3. In this example, traffic destined for ELPS group 1, and therefore terminates in OLT 104 will pass through OLT 102, continue along the working path 120 of the ring 114, and terminate in the OLT 104. When a switching condition (e.g., a line break) is detected on the working path 120, the ELPS functionality implemented by the ELPS interface 124 and the corresponding ELPS interface 130 in the OLT 102 will switch the communication path used to deliver traffic to the OLT 104. More specifically, traffic that is destined for the OLT 104 will pass through the OLT 102, continue along the protection path 122 of the ring 114 (rather than the working path 120), and terminate in the OLT 104.

ELPS protection can be similarly implemented for OLT 106 and OLT 108 in the RNT 100. For example, the ELPS interface 126 and corresponding ELPS interface 132 provide protection for traffic destined for ELPS group 2, which terminates in the OLT 106, and the ELPS interface 128 and corresponding ELPS interface 134 provide protection for traffic destined for ELPS group 3, which terminates in OLT 108. More specifically, the ELPS functionality implemented using the pairs of ELPS interfaces for ELPS group 2 and ELPS group 3 will switch traffic from the active path to the standby path when a switching condition is detected on the active path of the rings 116 and 118, respectively. The manner in which a switching condition is detected will be discussed in detail with reference to FIG. 2.

Figure 2:
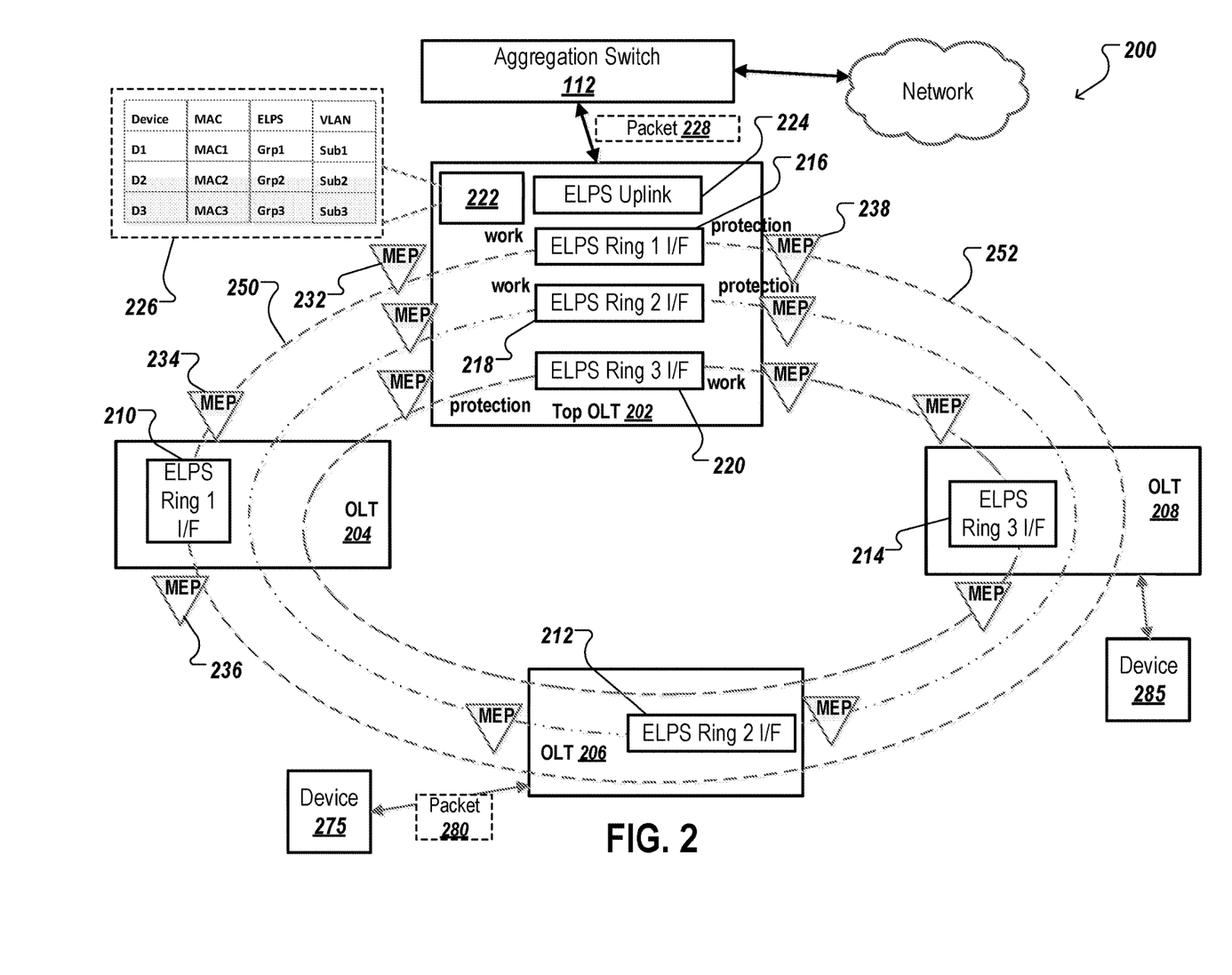
FIG. 2 is an illustration of an example Ring Network Topology implementing an ELPS protocol in a MAC-switched 1:N VLAN Scenario.

FIG. 2 is an illustration of an example Ring Network Topology ("RNT") 200 implementing an ELPS protocol in a MAC-switched 1:N VLAN Scenario. The RNT 200 is similar to the RNT 100 of FIG. 1 in that the RNT 200 includes a top OLT 202, and three other OLTs 204, 206, and 208 (or other Ethernet nodes). The OLTs 204, 206, and 208 each include an ELPS interface (e.g., 210, 212, 214), which implement ELPS functionality for the OLTs with the corresponding ELPS interfaces (e.g., 216, 218, 220) that are included in the top OLT 202. For example, the pair of ELPS interfaces 210 and 216 implement the ELPS functionality for the OLT 204, the pair of ELPS interfaces 212 and 218 implement the EPLS functionality for the OLT 206, and the pair of ELPS interfaces 214 and 220 implement the ELPS functionality for the OLT 208.

The top OLT 202 includes a translation apparatus 222 that facilitates shared services in the MAC-switched 1:N VLAN capability. As discussed in more detail below, the translation apparatus 222 enables the OLT 202 to forward traffic to the OLTs 204, 206, and 208 on VLAN sub-networks corresponding to the ELPS groups that are terminated by each of the particular OLTs. For example, the translation apparatus 222 can store mappings between (i) ELPS groups that are terminated by each of the OLTs and (ii) the VLAN sub-network that was created for each of those ELPS groups, and the top OLT 202 can use those mappings when traffic is received at the ELPS uplink 224 to forward the traffic to the destination devices serviced by the OLTs in the RNT 200 by way of the appropriate VLAN sub-network. For brevity, the following discussion refers to operations performed by the top OLT 202. It should be understood that any of the operations can be performed by the translation apparatus 222 and/or other components of the OLT 202, as well as other Ethernet nodes.

To create the mappings, the top OLT 202 monitors upstream traffic (e.g., a packet forwarded by one of the OLTs 204, 206, or 208) and generates a new mapping when the top OLT identifies a MAC address of a device (e.g., devices serviced by the OLTs) that is not yet known to the top OLT 202. For example, assume that a device 275 serviced by OLT 206 is brought online and newly added to the RNT 200. In this example, the device can transmit a packet 280 to the OLT 206, which then forwards the packet 280 to the top OLT 202 on the VLAN assigned to the ELPS group of the OLT 206. In turn, the top OLT 202 will receive the packet 280 that includes the MAC address of the device 275 on the VLAN subnetwork assigned to the ELPS interface to the OLT 206, and can determine that there is no stored mapping between the MAC address of the device 275 and the VLAN assigned to that ELPS group (e.g., by comparing the MAC address to MAC addresses stored in association with the mappings in the translation apparatus 222, and determining that there is not a match).

In response to determining that there is no VLAN and/or ELPS group mapping to this MAC address, the top OLT 202 (e.g., by way of the translation apparatus 222) can extract the MAC address from the packet, and store the MAC address in memory. The top OLT 202 can also store an association between the MAC address of the device 275 and an ELPS group that is terminated by the OLT 206.

A different VLAN sub-network can be provisioned for each ELPS group and mappings between downstream device MAC addresses, ELPS groups, and/or VLANs can be maintained, such that the top OLT 202 (e.g., by way of the translation apparatus) has the ability to identify the appropriate VLAN sub-network to use for downstream traffic that is destined for devices serviced by the OLT 206 (or other OLTs 202 and 204) when the top OLT 202 receives traffic that identifies the MAC address of a device serviced by the OLT 206, even though the traffic does not specify the ELPS group of the OLT 206 or the VLAN sub-network of the ELPS group of the OLT 206. The top OLT 202 can create similar mappings for all additional devices that are serviced by other OLTs in the RNT 200 so that the top OLT 202 has access to a translation index 226.

When the top OLT 202 (or another Ethernet node) receives downstream traffic (e.g., traffic entering the RNT 200 through the top OLT 202) on a VLAN of a shared service (e.g., VLAN 4090), which is referred to as a VLAN service address, the top OLT 202 can identify the MAC address of the destination device. For example, assume that packet 228 specifies the VLAN service address of 4090, which is the VLAN service address of the top OLT 202. In this example, the top OLT 202 can receive the packet 228, and inspect the packet 228 to identify a destination MAC address for the packet 228.

The OLT 202 can search the translation index 226 using the destination MAC address as the search string to determine whether there is an entry corresponding to the destination MAC address in the translation index 226. For example, assuming that the destination MAC address is 00-B0-D0-63-C2-26, the top OLT 202 can query a memory structure containing the translation index 226 to determine whether there is a matching MAC address in the translation index 226, and use the results of the query to determine how to forward the packet 228 in the RNT 200. For example, when the top OLT 202 determines that there is not a matching MAC address in the translation index 226, the top OLT 202 can "flood" the packet in the RNT 200 by transmitting it on all known VLAN sub-networks in the RNT 200. When the top OLT 202 determines that there is a matching MAC address in the translation index 226, the top OLT 202 can forward the packet 228 using a corresponding VLAN sub-network that is mapped to that matching MAC address.

More specifically, when the top OLT 202 identifies a matching MAC address in the translation index 226, the top OLT 202 can determine (e.g., based on the mappings discussed above) the ELPS group that is mapped to the MAC address, as well as the VLAN sub-network that is assigned to that ELPS group and/or mapped to the MAC address/ELPS group pair, and forward the packet 228 through the RNT 200 to the determined VLAN sub-network. For purposes of example, assume that the destination MAC address 00-B0-D0-63-C2-26 is the MAC address of the device 285 that is serviced by the OLT 208, and that the destination MAC address is stored in the translation index 226. In this example, the top OLT 202 can use the stored mappings to determine that the MAC address is mapped to ELPS group 3, and that the VLAN subnetwork 4083 is mapped to ELPS group 3. In turn, the top OLT 202 can forward the contents of the packet using the VLAN subnetwork 4083. As such, shared services can be implemented in the RNT 200 that implements ELPS protection because the OLT 202 has the ability to transfer incoming external traffic to the appropriate ELPS group (e.g., based on the MAC address), and then use the ELPS group to VLAN sub-network mapping to forward the traffic within the RNT 200.

As discussed, the RNT 200 implements the ELPS protocol to provide resiliency while reducing issues that arise using typical ring protection protocols, such as ERPS (Ethernet Ring Protection Switching, ITU G.8032). When a switching condition exists on a link between the top OLT 202 and one of the other OLTs in the RNT 200, the ELPS protection will switch the traffic from an active path to a standby path.

To detect when a switching condition exists, the RNT 200 utilizes Maintenance End Points (MEPs) on each working path and each protection path between pairs of ELPS interfaces. For example, MEP 232 and MEP 234 are located at the ends of the working path that is between the ELPS interface 216 and the ELPS interface 210. Similarly, MEP 236 and MEP 238 are located at the ends of the protection path that is between the ELPS interface 216 and the ELPS interface 210. In operation, the MEPs are part of the OAM (operations, administration and maintenance) connectivity supervision, and utilize the OAM protocol to switch the active path when a switching condition exists. A switching condition can be determined to exist when periodic messages exchanged between a pair of MEPs are not being received. For example, assume that IEEE 802.1ag Continuity Check Messages (CCMs) are sent between MEP 232 and MPE 234 at periodic intervals. If the CCM messages transmitted by MEP 232 do not arrive at receiving MEP 234, the MEP 234 declares a loss of connectivity, which is a switching condition. In this example, the ELPS functionality provided by the ELPS interface 210 and the ELPS interface 216 can switch traffic to the OLT 204 from the working path to the protection path based on the determination that a switching condition exists.

In some implementations, the RNT 200 can be configured to support the transmission of external multicast traffic to the nodes (e.g., OLTs) in the RNT 200. In these implementations, the top OLT 202 can track the MAC addresses of the OLTs that are subscribed to various services that are distributed using multicast traffic, and which of the OLTs need to receive specific multicast traffic over time. For instance, when OLTs in the RNT 200 are supporting IPTV (Internet Protocol Television) services, the top OLT 202 can maintain multicast groups that include lists of OLTs that need to receive multicast traffic for various channels of the IPTV service.

In a specific example, assume that the OLT 206 has a subscriber that has tuned to a particular channel. In this example, the OLT 206 could send a "join" message to the top OLT 202 requesting to receive the multicast traffic for the particular channel. In response to receiving the join request from the OLT 206, the top OLT 202 can add the MAC address for the channel to a multicast group maintaining a list of nodes that are to receive the multicast traffic for the particular channel, and the top OLT 202 can transmit the multicast traffic for that particular channel to each of the OLTs in the list of nodes as it is received. More specifically, when the multicast traffic for the particular channel is received, the top OLT 202 can determine that the MAC address for the subscriber device and/or OLT 206 is among the MAC addresses in the multicast group for that particular channel. In turn, the top OLT 202 can use the MAC address to identify the ELPS group and the VLAN to which the multicast traffic should be forwarded to reach the subscriber device (e.g., by way of the OLT 206), as discussed in detail above. This can be performed for each of the subscriber devices or OLTs that are to receive the multicast traffic, such that the multicast traffic will be forwarded to each of the devices that have tuned to the particular channel.

In some implementations, unknown multicast traffic (e.g., multicast traffic for which the MAC address for the channel is not found) could alternatively be flooded to the RNT 200, thereby allowing the additional OLTs in the RNT 200 to determine whether they have any subscribers currently using the multicast service. For example, when the top OLT 202 determines that there is not a matching MAC address for the multicast traffic in the translation index 226, the top OLT 202 can "flood" the packet in the RNT 200 by transmitting it on all known VLAN sub-networks in the RNT 200. This would not require the top OLT 202 to maintain the multicast groups, but would result in additional network traffic.

Figure 3:
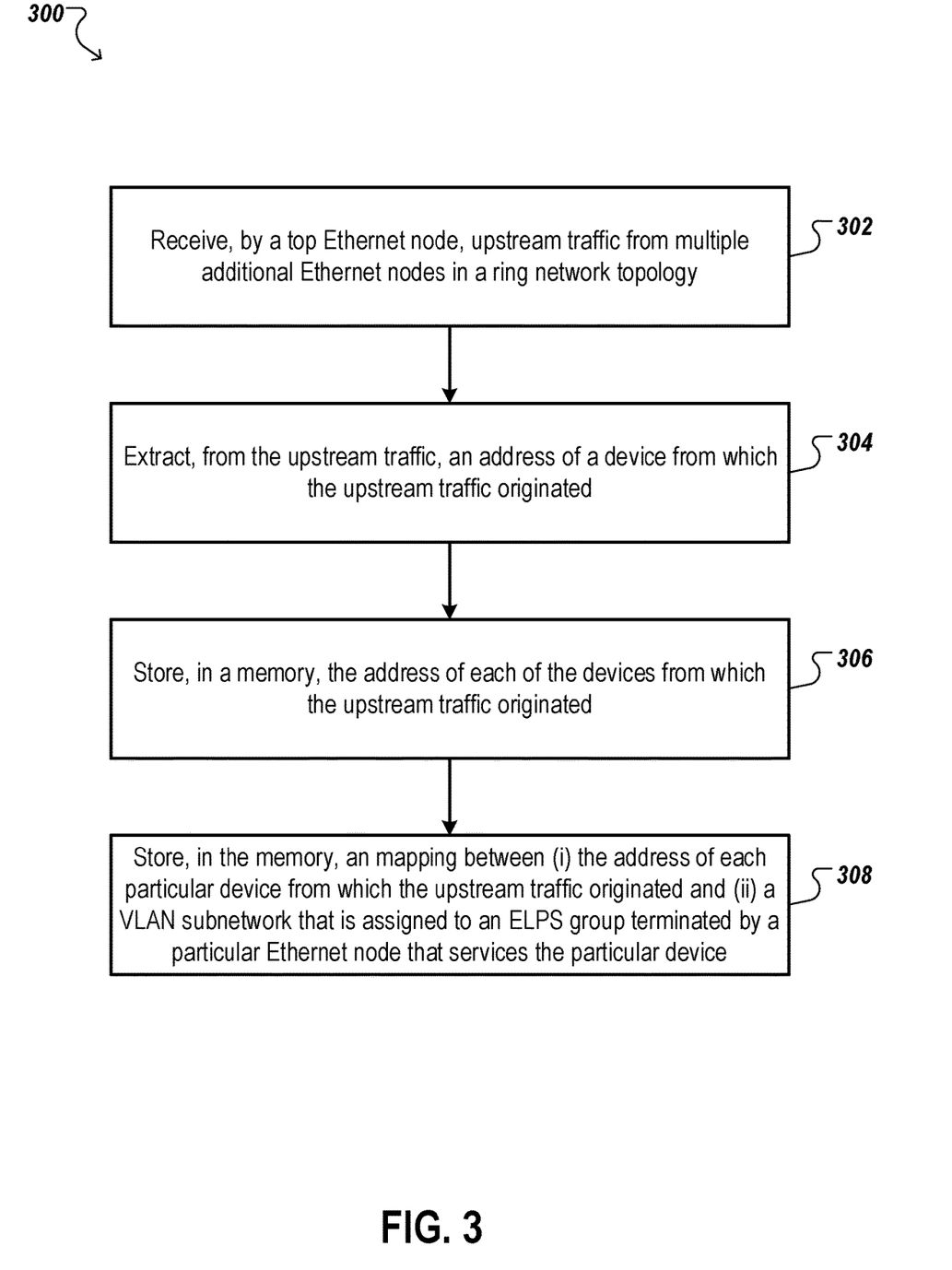
FIG. 3 is a flow chart of an example process for mapping OLTs to ELPS groups and ELPS groups to corresponding VLANs

FIG. 3 is a flow chart 300 of an example process for mapping device addresses to ELPS groups and corresponding VLANs. Operations of the process 300 can be performed, for example, by the top OLT 202 and/or the translation apparatus 222 of FIG. 2 or another Ethernet node. Alternatively or additionally, operations of the process 300 can be performed by one or more other data processing apparatus. In some implementations, operations of the process 300 can be implemented as instructions stored on a computer readable medium (e.g., non-transitory computer readable medium), such that execution of the instructions by one or more data processing apparatus (e.g., computing devices) cause the one or more data processing apparatus to perform the operations of the process 300.

A top Ethernet node, such as the top OLT 202 of FIG. 2, receives upstream traffic from multiple additional Ethernet nodes that are in a Ring Network Topology ("RNT") with the top Ethernet node (302). In some implementations, when a device (e.g., device 275 of FIG. 2) that is serviced by an Ethernet node (e.g., OLT) is powered on and/or added to the RNT serviced by the top Ethernet node, that device will transmit one or more messages identifying itself to the top Ethernet node and other devices in the RNT. In these implementations, the top Ethernet node will receive these messages from the new devices by way of traffic forwarded by the other Ethernet nodes in the RNT. These communications are considered upstream traffic because it originates at the devices serviced by the Ethernet nodes within the RNT of the top Ethernet node, and therefore, are not entering the RNT through the top Ethernet node. Multiple different devices and/or Ethernet nodes can be brought online in the RNT (e.g., powered up and/or added to the RNT), either simultaneously or over time, and the top Ethernet node can receive the upstream traffic from each of those devices and/or Ethernet nodes. Note that an RNT can have multiple top Ethernet nodes that each provide different entry points to the RNT, and each of the Ethernet nodes can manage traffic in a similar manner.

For each of the devices from which upstream traffic is received, an address of the device is extracted (304). For example, the top Ethernet node of the RNT can identify, within the upstream traffic, the MAC address (or another device specific identifier) of the device that generated the upstream traffic, and extract that MAC address.

The address of each of the devices is stored in a memory (306). For example, as discussed above with reference to FIG. 2, the address of each device can be stored in a memory structure storing translation index 226.

A mapping between (i) the address of each particular device from which upstream traffic was received and (ii) a VLAN subnetwork that is assigned to an ELPS group terminated by a particular Ethernet node that services the particular device (308). In some implementations, the association between the address of the device and the ELPS group of the additional Ethernet node that services the device can be stored by storing a connection between the address and the ELPS group in a relational database, or another database structure that represents connections, relationships, and/or associations between data objects. For example, the MAC address of the device serviced by the additional Ethernet node and the ELPS group of the additional Ethernet node can be stored in a same row of a database as shown in the translation index 226 of FIG. 2, or otherwise be stored with a reference to each other.

The ELPS group that is terminated by each particular Ethernet node among the multiple additional Ethernet nodes is assigned and mapped to a different VLAN subnetwork (308). In some implementations, a separate VLAN subnetwork address is mapped to each ELPS group so that traffic destined for each ELPS group can be forwarded to on the VLAN dedicated to that ELPS group, thereby reducing the traffic processed by other ELPS groups that are on other corresponding VLANs. For example, as shown in FIG. 2, three different VLAN subnetworks (4081, 4082, and 4083) are mapped to the three different ELPS groups terminated by the three different OLTs (204, 206, and 208) serviced by the top OLT 202. As such, in this example, the top OLT 202 uses a different VLAN subnetwork for devices serviced by each of the OLTs, which each terminate a corresponding different ELPS group.

In some situations, n−1 different VLAN subnetworks can be provisioned when n additional Ethernet nodes are in the Ring Network Topology with a top Ethernet node. For example, instead of provisioning a separate VLAN subnetwork for each ELPS group, the VLAN service address of the top Ethernet node could be used for one of the additional Ethernet node (e.g., OLTs 204, 206, or 208), such that one less (e.g., n−1) than the total number of additional Ethernet node (n) can be provisioned. In these implementations, the top Ethernet node of the Ring Network Topology would ultimately store an association between the VLAN service address and the ELPS group for a particular Ethernet node among the additional Ethernet nodes, such that the top Ethernet node would forward traffic destined to the MAC addresses of devices serviced by the particular Ethernet node on the VLAN service address based on the association between the MAC addresses of the devices serviced by the particular Ethernet node, the ELPS group for the particular Ethernet node and the VLAN service address.

Figure 4:
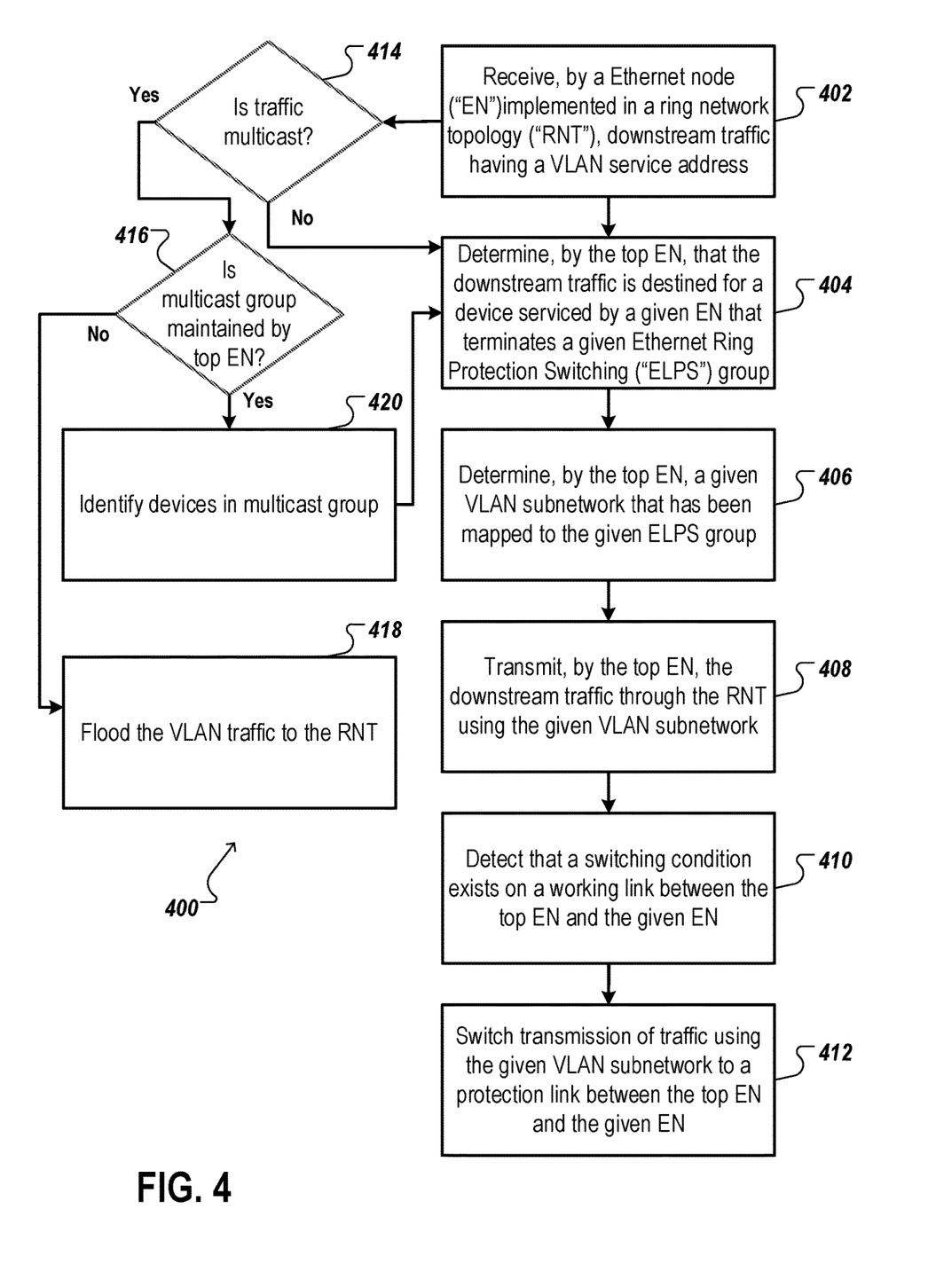
FIG. 4 is a flow chart of an example process for protecting a Ring Network Topology using an ELPS protocol.

FIG. 4 is a flow chart of an example process 400 for protecting a Ring Network Topology ("RNT") using an ELPS protocol. Operations of the process 400 can be performed, for example, by the top OLT 202 and/or the translation apparatus 222 of FIG. 2, or another Ethernet node. Alternatively or additionally, operations of the process 400 can be performed by one or more other data processing apparatus. In some implementations, operations of the process 400 can be implemented as instructions stored on a computer readable medium (e.g., non-transitory computer readable medium), such that execution of the instructions by one or more data processing apparatus (e.g., computing devices) cause the one or more data processing apparatus to perform the operations of the process 400.

A top Ethernet node, implemented in a Ring Network Topology, receives downstream traffic having a VLAN service address (402). The VLAN service address is used to transmit data for shared services to the top Ethernet node for distribution to devices serviced by other Ethernet nodes that are included in the RNT with the top Ethernet node. The top Ethernet node is an entry point to the RNT, and therefore, the point through which traffic to, and from, the RNT passes to other networks/devices that are not included in the RNT. As previously noted, the RNT can include multiple different top Ethernet nodes to provide connections to various other networks, and each of the top Ethernet nodes can perform similar operations.

With reference to FIG. 2, the VLAN service address is 4090, and is used for shared services destined for the RNT 200. As such, the top OLT 202 receives the downstream traffic having the VLAN service address and processes that traffic as described below.

A determination is made that the downstream traffic is destined for a given device serviced by a given Ethernet node that terminates a given ELPS group (404). In some implementations, the determination that the downstream traffic is destined for a given device serviced by a given Ethernet node can be performed by identifying a stored association between the address of the given device and the given ELPS group in a data structure.

For example, the top Ethernet node of the RNT can use the destination MAC address included in the downstream traffic to forward the downstream traffic on the appropriate VLAN subnetwork within the RNC. More specifically, as discussed with reference to FIG. 2, the top OLT 202 can identify the destination MAC address from the downstream traffic packet 228, and use that destination MAC address to search the translation index 226 for a matching MAC address. When a match is found, the top OLT 202 can identify the ELPS group that is indexed to the matching MAC address as the ELPS group of the OLT that services the device having the destination MAC address.

The top Ethernet node determines a given VLAN subnetwork address that has been mapped to the ELPS group (406). In some implementations, the top Ethernet node can determine that a given VLAN subnetwork address has been mapped to the ELPS group using a translation index or another memory structure that stores associations/mappings between VLAN subnetworks and ELPS groups. For example, the top Ethernet node can use the ELPS group that was determined to be associated with the destination MAC address as a query to a database structure or another data structure that stores associations between ELPS groups and VLAN subnetwork addresses in memory. The data structure that stores the associations between the ELPS groups and the VLAN subnetwork addresses can be the same data structure that stores the associations/mappings between the MAC addresses and the ELPS groups or a separate data structure. In some situations, a separate query is not needed to identify the VLAN subnetwork address because the VLAN subnetwork address can be determined using the mappings between the MAC addresses, ELPS groups, and VLAN subnetworks once the matching MAC address has been identified.

The downstream traffic is transmitted through the RNT using the given VLAN subnetwork (408). In some implementations, the top Ethernet node transmits the downstream traffic through the RNT by forwarding the downstream traffic on the given VLAN subnetwork so that other Ethernet nodes that are not included in the given VLAN subnetwork will ignore the downstream traffic, thereby reducing the amount of data that the other Ethernet nodes need to process, which results in a more efficient network environment. Furthermore, traffic transmitted on the given VLAN is ELPS protected by the pair of ELPS interfaces for the ELPS group of the Ethernet node, which are located at the top Ethernet node and the destination Ethernet node, so that if a fault is detected at any point between the top OLT and the destination OLT, the traffic can be switched from the active path to the standby path for that ELPS group. Meanwhile, other ELPS groups having active paths that are not affected by the detected fault will continue to communicate over their active paths.

The existence of a switching condition is detected on a working path that is being used to carry traffic between the top Ethernet node and the given Ethernet node (410). In some implementations, the existence of the switching condition can be detected using MEPs that are connected at each end of a path between two Ethernet nodes. For example, as discussed with reference to FIG. 2, MEP 232 and MEP 234 are located at the ends of the working path that is between the ELPS interface 216 and the ELPS interface 210. In operation, the MEPs are part of the OAM (operations, administration and maintenance) connectivity supervision, and utilize the OAM protocol to switch the active path when a switching condition exists.

A switching condition can be determined to exist when periodic messages exchanged between a pair of MEPs are not being received. For example, assume that IEEE 802.1ag Continuity Check Messages (CCMs) are sent between MEP 232 and MPE 234 at periodic intervals. If the CCM messages transmitted by MEP 232 do not arrive at receiving MEP 234, the MEP 234 declares a loss of connectivity, which is a switching condition on the working path 250.

Transmission of traffic using the given VLAN subnetwork is switched from the working path to a protection path between the top Ethernet node and the given Ethernet node (414). In some implementations, the ELPS protection provided by the EPLS interfaces at the top Ethernet node and the given Ethernet node can switch traffic from the working path to the protection path when the switching condition is detected. For example, as discussed with reference to FIG. 2, the ELPS functionality provided by the ELPS interface 210 and the ELPS interface 216 can switch traffic to the OLT 204 from the working path 250 to the protection path 252 based on the determination that a switching condition exists on the working path 250.

In some implementations, the ELPS protected Ring Network Topology can be implemented to support multicast traffic. In these implementations, when the top OLT receives downstream traffic (402), the Ethernet node proceeds to determine whether the downstream traffic is multicast traffic (414). For example, the top Ethernet node can determine whether MAC address of the downstream traffic identifies the downstream traffic as multicast traffic. When the top Ethernet node determines that the downstream traffic is not multicast traffic, the top Ethernet node can proceed to operation 404 and the rest of the process 400 as discussed above.

When the top Ethernet node determines that the downstream traffic is multicast traffic, the top Ethernet node can proceed to determine whether a multicast group is maintained by the top Ethernet node (416). For example, the top Ethernet node can use the multicast group identifier included in the downstream traffic to search a set of multicast groups that have been created by, are being maintained by, or are otherwise available to the top Ethernet node. When the search reveals a match between the multicast group identifier included in the downstream traffic and a multicast group in the maintained (or otherwise available) multicast groups, the top Ethernet node can identify the devices by way of MAC addresses (or other identifiers) of the devices serviced by the additional OLTs in the RNT that are destination MAC addresses for the multicast traffic (420). Once the destination MAC addresses have been identified by the top Ethernet node, the process 400 can proceed to operation 404 and beyond to get the multicast traffic to the destination devices in the manner discussed above.

When the top Ethernet node determines that a multicast group is not maintained by for this downstream traffic or the MAC address for the channel is not found, the top Ethernet node can flood the downstream traffic to all Ethernet nodes in the RNT (418). For example, when the search using the multicast group identifier fails to identify a matching multicast group identifier, the top Ethernet node can flood the downstream traffic to the RNT by transmitting the downstream traffic over all links and VLAN subnetworks to allow the additional Ethernet nodes in the RNT to process the multicast traffic as appropriate.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method, comprising:
receiving, by a top Ethernet node implemented in a Ring Network Topology ("RNT") that includes multiple additional Ethernet nodes, downstream traffic that (i) is traffic that enters into the RNT from the top Ethernet node, (ii) is destined to egress the RNT through a node that is not the top Ethernet node, and (iii) has a virtual local area network ("VLAN") service address;
determining which Ethernet Linear Protection Switch ("ELPS") to forward based on a discovery of upstream traffic learned that is sourced from a different node than the top Ethernet node of the RNT and egresses the top Ethernet node of the RNT;
determining, by the top Ethernet node, that the downstream traffic is destined for a device serviced by a given Ethernet node, from among the multiple additional Ethernet nodes, that terminates a given ELPS group;
monitoring connected ends between two Ethernet nodes on a given path made of two ELPS endpoints via ELPS protocols;
determining, by the top Ethernet node, a given VLAN subnetwork that has been mapped to the given ELPS group; and
transmitting, by the top Ethernet node, the downstream traffic through the RNT using the given VLAN subnetwork and based on a current ELPS protection state of working path or protection path.

2. The method of claim 1, further comprising:
receiving, by the top Ethernet node, upstream traffic from the multiple additional Ethernet nodes in the RNT;
extracting, from the upstream traffic, a MAC address of a device from which the upstream traffic originated;
storing, in a memory, the MAC address of each of the devices from which the upstream traffic originated; and
storing, in the memory, a mapping between (i) the MAC address of each particular device from which the upstream traffic originated and (ii) a VLAN subnetwork that is assigned to an ELPS group that is terminated by a particular Ethernet node that services the particular device.

3. The method of claim 2, further comprising:
searching, by the top Ethernet node, a translation index using a destination MAC address included in the downstream traffic, wherein the translation index includes a first mapping of MAC addresses to a plurality of ELPS groups and a second mapping of the plurality of ELPS groups to VLAN subnetworks assigned to the plurality of ELPS groups, wherein:
determining that the downstream traffic is destined for a device serviced by a given Ethernet node that terminates a given Ethernet Linear Protection Switching ("ELPS") group comprises identifying the stored mapping between the destination MAC address of the device and the given ELPS group based on the searching identifying, in the first mapping, a mapping between the destination MAC address and a given ELPS group that is terminated by the given Ethernet node; and
determining, by the top Ethernet node, the given VLAN subnetwork that has been mapped to the given ELPS group comprises determining the given VLAN subnetwork based on the second mapping including a mapping between the given ELPS group and the given VLAN subnetwork.

4. The method of claim 2, further comprising provisioning at least n−1 different VLAN subnetworks for the multiple additional Ethernet nodes, wherein n is a total number of the additional Ethernet nodes that are in the RNT with the top Ethernet node.

5. The method of claim 1, further comprising:
determining that the downstream traffic is multicast traffic, wherein:
determining that the downstream traffic is destined for a device serviced by a given Ethernet node comprises determining that a destination MAC address of the device is included in a multicast group created for the multicast traffic; and
transmitting the downstream traffic through the RNT using the given VLAN subnetwork is conditioned on the determination that the destination MAC address of the device is included in the multicast group created for the multicast traffic.

6. The method of claim 1, further comprising:
determining that the downstream traffic is multicast traffic; and,
determining that the multicast traffic is to be flooded to multiple VLANs in the RNT based on a lack of a multicast group being maintained by the top OLT.

7. The method of claim 1, further comprising:
detecting that a switching condition exists on a working path that is being used to carry traffic between the top Ethernet node and the given Ethernet node; and
switching, based on the detected switching condition, transmission of traffic using the given VLAN subnetwork to a protection path between the top Ethernet node and the given Ethernet node, wherein the protection path is a different portion of the RNT that connects the top Ethernet node and the given Ethernet node than the working path.

8. The method of claim 1, wherein:
a second top Ethernet node operates as another entry point to the RNT; and
the second top Ethernet node maintains a mapping of ELPS groups to VLAN subnetworks for traffic entering the RNT through the second top Ethernet node.

9. A top optical line terminal ("OLT") comprising:
a memory; and
a translation apparatus, including one or more data processors, configured to execute instructions that, upon execution, cause the top OLT to perform operations comprising:
receiving, in a Ring Network Topology ("RNT") that includes multiple additional Ethernet nodes, downstream traffic that (i) is traffic that enters into the RNT from a top Ethernet node, (ii) is destined to egress the RNT through a node that is not the top Ethernet node, and (iii) has a virtual local area network ("VLAN") service address;
determining which Ethernet Linear Protection Switch ("ELPS") to forward based on a discovery of upstream traffic learned that is sourced from a different node than the top Ethernet node of the RNT and egresses the top Ethernet node of the RNT;
determining that the downstream traffic is destined for a device serviced by a given Ethernet node, from among the multiple additional Ethernet nodes, that terminates a given ELPS group;
monitoring connected ends between two Ethernet nodes on a given path made of two ELPS endpoints via ELPS protocols;
determining a given VLAN subnetwork that has been mapped to the given ELPS group; and
transmitting the downstream traffic through the RNT using the given VLAN subnetwork and based on a current ELPS protection state of working path or protection path.

10. The top optical line terminal of claim 9, wherein the instructions cause the top OLT to perform operations further comprising:
receiving upstream traffic from the multiple additional Ethernet nodes in the RNT;
extracting, from the upstream traffic, a MAC address of a device from which the upstream traffic originated;
storing, in a memory, the MAC address of each of the devices from which the upstream traffic originated; and
storing, in the memory, a mapping between (i) the MAC address of each particular device from which the upstream traffic originated and (ii) a VLAN subnetwork that is assigned to an ELPS group that is terminated by a particular Ethernet node that services the particular device.

11. The top optical line terminal of claim 10, wherein:
the instructions cause the top OLT to perform operations comprising searching a translation index using a destination MAC address included in the downstream traffic, wherein the translation index includes a first mapping of MAC addresses to a plurality of ELPS groups and a second mapping of the plurality of ELPS groups to VLAN subnetworks assigned to the plurality of ELPS groups;
determining that the downstream traffic is destined for a device serviced by a given Ethernet node that terminates a given Ethernet Linear Protection Switching ("ELPS") group comprises identifying the stored mapping between the destination MAC address of the device and the given ELPS group based on the searching identifying, in the first mapping, a mapping between the destination MAC address and a given ELPS group that is terminated by the given Ethernet node; and
determining the given VLAN subnetwork that has been mapped to the given ELPS group comprises determining the given VLAN subnetwork based on the second mapping including a mapping between the given ELPS group and the given VLAN subnetwork.

12. The top optical line terminal of claim 9, wherein the instructions cause the top OLT to perform operations further comprising determining that the downstream traffic is multicast traffic, wherein:
determining that the downstream traffic is destined for a device serviced by a given Ethernet node comprises determining that a destination MAC address of the device is included in a multicast group created for the multicast traffic; and
transmitting the downstream traffic through the RNT using the given VLAN subnetwork is conditioned on the determination that the destination MAC address of the device is included in the multi cast multicast group created for the multicast traffic.

13. The top optical line terminal of claim 9, wherein the instructions cause the top OLT to perform operations further comprising:
determining that the downstream traffic is multicast traffic; and,
determining that the multicast traffic is to be flooded to multiple VLANs in the RNT based on a lack of a multicast group being maintained by the top OLT.

14. The top optical line terminal of claim 9, wherein the instructions cause the top OLT to perform operations further comprising:
detecting that a switching condition exists on a working path that is being used to carry traffic between the top OLT and the given Ethernet node; and
switching, based on the detected switching condition, transmission of traffic using the given VLAN subnetwork to a protection path between the top OLT and the given Ethernet node, wherein the protection path is a different portion of the RNT that connects the top OLT and the given Ethernet node than the working path.

15. A non-transitory computer readable medium storing instructions that, upon execution by one or more data processing apparatus, cause the one or more data processing apparatus to perform operations comprising:
receiving, in a Ring Network Topology ("RNT") that includes multiple additional Ethernet nodes, downstream traffic that (i) is traffic that enters into the RNT from a top Ethernet node, (ii) is destined to egress the RNT through a node that is not the top Ethernet node, and (iii) has a virtual local area network ("VLAN") service address;
determining which Ethernet Linear Protection Switch ("ELPS") to forward based on a discovery of upstream traffic learned that is sourced from a different node than the top Ethernet node of the RNT and egresses the top Ethernet node of the RNT;

determining that the downstream traffic is destined for a device serviced by a given Ethernet node, from among the multiple additional Ethernet nodes, that terminates a given ELPS group;

monitoring connected ends between two Ethernet nodes on a given path made of two ELPS endpoints via ELPS protocols;

determining a given VLAN subnetwork that has been mapped to the given ELPS group; and transmitting the downstream traffic through the RNT using the given VLAN subnetwork and based on a current ELPS protection state of working path or protection path.

16. The non-transitory computer readable medium of claim 15, wherein the instructions cause the one or more data processing apparatus to perform operations further comprising:

receiving upstream traffic from the multiple additional Ethernet nodes in the RNT;

extracting, from the upstream traffic, a MAC address of a device from which the upstream traffic originated;

storing, in a memory, the MAC address of each of the devices from which the upstream traffic originated; and storing, in the memory, a mapping between (i) the MAC address of each particular device from which the upstream traffic originated and (ii) a VLAN subnetwork that is assigned to an ELPS group that is terminated by a particular Ethernet node that services the particular device.

17. The non-transitory computer readable medium of claim 16, wherein;

the instructions cause the one or more data processing apparatus to perform operations comprising searching a translation index using a destination MAC address included in the downstream traffic, wherein the translation index includes a first mapping of MAC addresses to a plurality of ELPS groups and a second mapping of the plurality of ELPS groups to VLAN subnetworks assigned to the plurality of ELPS groups;

determining that the downstream traffic is destined for a device serviced by a given Ethernet node that terminates a given Ethernet Linear Protection Switching ("ELPS") group comprises identifying the stored mapping between the destination MAC address of the device and the given ELPS group based on the searching identifying, in the first mapping, a mapping between the destination MAC address and a given ELPS group that is terminated by the given Ethernet node; and determining the given VLAN subnetwork that has been mapped to the given ELPS group comprises determining the given VLAN subnetwork based on the second mapping including a mapping between the given ELPS group and the given VLAN subnetwork.

18. The non-transitory computer readable medium of claim 15, wherein the instructions cause the one or more data processing apparatus to perform operations further comprising determining that the downstream traffic is multicast traffic, wherein:

determining that the downstream traffic is destined for a device serviced by a given Ethernet node comprises determining that a destination MAC address of the device is included in a multicast group created for the multicast traffic; and transmitting the downstream traffic through the RNT using the given VLAN subnetwork is conditioned on the determination that the destination MAC address of the device is included in the multicast group created for the multicast traffic.

19. The non-transitory computer readable medium of claim 15, wherein the instructions cause the one or more data processing apparatus to perform operations further comprising:

determining that the downstream traffic is multicast traffic; and determining that the multicast traffic is to be flooded to multiple VLANs in the RNT based on a lack of a multicast group being maintained by the top OLT.

20. The non-transitory computer readable medium of claim 15, wherein the instructions cause the one or more data processing apparatus to perform operations further comprising:

detecting that a switching condition exists on a working path that is being used to carry traffic between the top Ethernet node and the given Ethernet node; and switching, based on the detected switching condition, transmission of traffic using the given VLAN subnetwork to a protection path between the top Ethernet node and the given Ethernet node, wherein the protection path is a different portion of the RNT that connects the top Ethernet node and the given Ethernet node than the working path.

* * * * *